June 24, 1930.  A. J. MENCHEY  1,767,996
PISTON
Filed Jan. 14, 1929
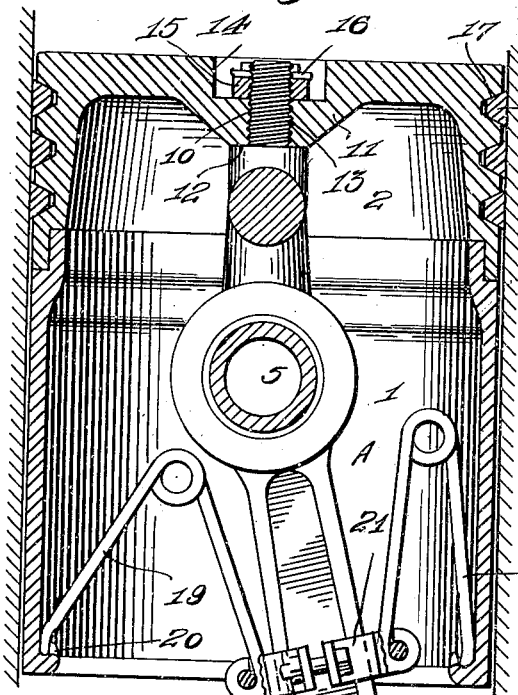
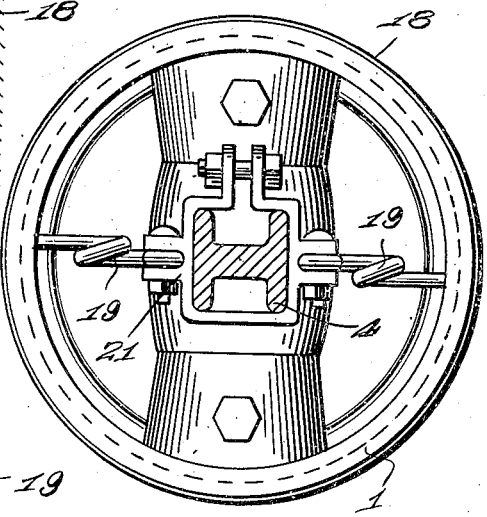
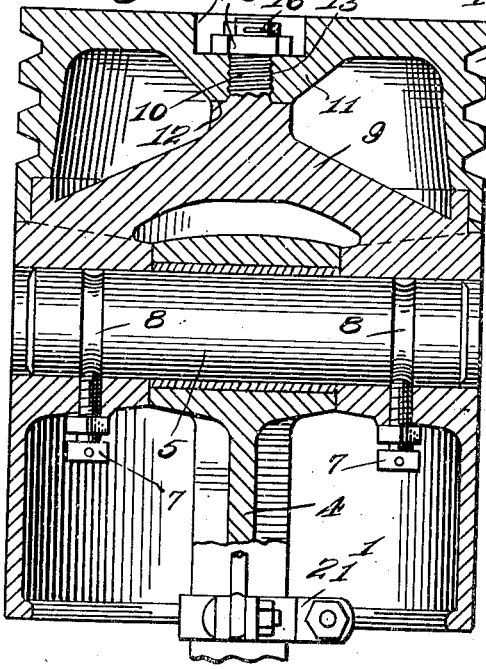
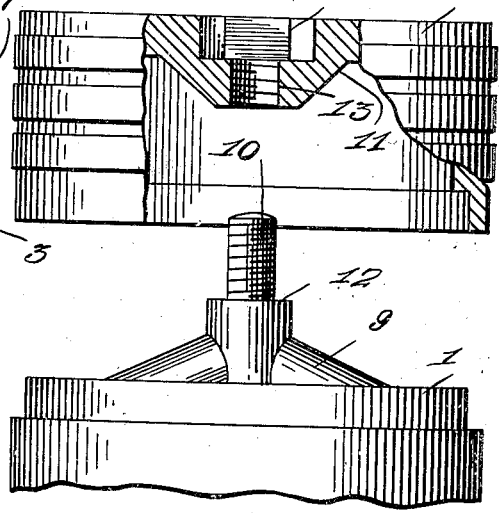
Albert J. Menchey,
INVENTOR
BY Victor J. Evans
ATTORNEY Patented June 24, 1930

1,767,996

UNITED STATES PATENT OFFICE

ALBERT JOHN MENCHEY, OF PHILADELPHIA, PENNSYLVANIA

PISTON

Application filed January 14, 1929. Serial No. 332,380.

This invention relates to pistons for gas and other engines, the general object of the invention being to so arrange and construct the parts that the ring carrying section of the piston can be easily and quickly removed from the cylinder without removing the section to which the connecting rod is attached, so that new rings can be substituted for the old ones and the ring carrying section, with the new rings therein, replaced in the minimum time and with little labor.

Another object of the invention is to make the rings and the grooves of wedge shape in cross section so that the rings will automatically accommodate themselves to the cylinder walls during the movement of the piston and thus prevent compression and oil leaks.

A still further object of the invention is to provide means for preventing piston slap.

This invention also consists in certain other features of construction and in the combination and arrangement of the several parts, to be hereinafter fully described, illustraed in the accompanying drawing and specifically pointed out in the appended claim.

In describing the invention in detail reference will had to the accompanying drawing wherein like characters denote like or corresponding parts throughout the several views, and in which:—

Figure 1 is a sectional view through the improved piston and showing the same in its cylinder.

Figure 2 is a sectional view through the piston, the section being taken at right angles to that on which Figure 1 is taken.

Figure 3 is a bottom plan view, with the connecting rod in section.

Figure 4 is an elevation partly in section, showing the two sections of the piston separated.

As shown in these views, the piston A is composed of the lower or skirt section 1 and the head or ring carrying section 2. The adjacent edges of the sections overlap, as shown at 3, and the section 1 is connected with the rod 4 by the wrist pin 5, which has its ends arranged in the usual bushings 6 formed in the section 1. Set screws 7 pass through the lower portions of the bushings and engage grooves 8 in the pin. An inverted Y-shaped member 9 has its lower ends formed with or connected to the upper portions of the bushings, and the upper end of the vertical part of said member is reduced and threaded, as shown at 10. The section 2 is formed with a depending projection 11 at its center, which rests on the shoulder 12 formed at the junction of the reduced part 10 with the other part of the member 9, and this projection 11 has a threaded hole 13 therein for receiving the threaded part 10. The upper end of the section 2 is countersunk around the hole, as shown at 14, to receive the nut 15 which is threaded on the end of the reduced part 10. A cotter pin 16 passes through this reduced part and the nut and locks the nut in position. This countersink 14 has its walls so shaped that it can receive a suitable tool so that the section 2 can be turned to detach it from or connect it with the threaded part 10 after the nut has been removed. The section 2 is formed with wedge-shaped ring receiving grooves 17 for receiving the wedge-shaped rings 18 and as the rings are carried by the section 2, it will be seen that it is simply necessary to remove the section 2 from the section 1 in order to replace the rings. Thus it is unnecessary to remove the section 1 in order to replace the rings and this eliminates the removal of the crank case and the oil therein and the disconnecting of the rod 4 from the crank shaft.

The wedge-shaped rings and grooves will prevent compression and oil leaks as the rings will automatically accommodate themselves to the walls of the cylinder during the movement of the piston.

I also provide means for preventing piston slap, such means comprising a pair of oppositely arranged springs 19 arranged in the piston, and each comprising a central coil part and depending limbs. The end of one limb of each spring is suitably connected with the lower end of the piston, as shown at 20, and the other end of each limb is connected to a clamp 21 which encircles the connecting rod. As the connecting rod is moving toward one side of the piston, one spring will be compressed and the other spring stretched, as shown in Figure 1, so that the springs will counterbalance each other and thus hold the lower end of the piston against the walls of the cylinder and prevent piston slap.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A piston of the class described comprising a lower section and a head section, means for connecting a connecting rod to the lower section, rings carried by the head section, means for detachably connecting the head section with the lower section, such means comprising a member having its lower end connected with a part of the lower section with a threaded upwardly extending part thereon and the head section having a depending projection for resting on a part of said member, with a threaded hole in said projection for receiving the threaded part, said upper section having a tool receiving recess therein surrounding the threaded hole and a nut in the recess engaging the threaded part.

In testimony whereof I affix my signature.

ALBERT JOHN MENCHEY.